US007581046B2

(12) United States Patent
Crawford et al.

(10) Patent No.: US 7,581,046 B2
(45) Date of Patent: *Aug. 25, 2009

(54) MULTI-IMAGE HARDWARE ACCESS SYSTEM FOR MANAGING ACCESS TO COMPUTER SUPPORT SYSTEMS

(75) Inventors: Timothy J. Crawford, Beaverton, OR (US); Brandon L. Hunt, Berthoud, CO (US); Brian A. Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 387 days.

This patent is subject to a terminal disclaimer.

(21) Appl. No.: 10/991,732

(22) Filed: Nov. 18, 2004

(65) Prior Publication Data

US 2006/0117207 A1    Jun. 1, 2006

(51) Int. Cl.
*G06F 5/00* (2006.01)
(52) U.S. Cl. ...................................................... 710/62
(58) Field of Classification Search ............... 710/10, 710/14, 62
See application file for complete search history.

(56) References Cited

U.S. PATENT DOCUMENTS

| 3,781,855 | A | * | 12/1973 | Killen ........................ 382/126 |
| 5,504,873 | A |   | 4/1996  | Martin et al. |
| 5,633,999 | A |   | 5/1997  | Clowes et al. |
| 5,682,549 | A | * | 10/1997 | Tanaka et al. .................. 710/8 |
| 5,745,747 | A | * | 4/1998  | Chang et al. .................... 707/8 |
| 5,748,870 | A |   | 5/1998  | Tims et al. |
| 6,477,648 | B1| * | 11/2002 | Schell et al. ................... 726/22 |
| 6,493,824 | B1| * | 12/2002 | Novoa et al. ................. 713/162 |
| 6,748,488 | B2|   | 6/2004  | Byrd et al. |
| 7,239,417 | B2| * | 7/2007  | Yoshii et al. ................ 358/1.18 |
| 2002/0133728 | A1 | * | 9/2002 | Agarwal ..................... 713/324 |
| 2003/0018974 | A1 | * | 1/2003 | Suga .......................... 725/86 |

OTHER PUBLICATIONS www.xreferplus.com—remoter procedure call (RPC), 2003, Wiley Publishing, Inc.*
Definitions of 'queue' and 'public key', www.xreferplus.com, Credo Reference.*
Besse, L. et al., "Large scale multipurpose interactive image processing facility at ETH-Zurich," Proceedings of the SPIE—The International Society for Optical Engineering, vol. 301, pp. 154-161, 1981.
Griffin, J.M. et al., "NCR MODUS: a data management subsystem," Proceedings of the Second International Conference and Workshop on Picture Archiving and Communication Systems (PACS II) for Medical Applications, May 1983, pp. 138-144.

* cited by examiner

*Primary Examiner*—Henry W. H. Tsai
*Assistant Examiner*—Hyun Nam
(74) *Attorney, Agent, or Firm*—Quarles & Brady LLP

(57) ABSTRACT

A computer system includes a communication adapter that connects a plurality of virtualized servers to one or more support system devices. The communication adapter includes a master lock register, a processing device, a queue, and a multitude of adapter access registers. Upon initialization, a virtual server asserts ownership over the communication adapter by writing its identification into the master lock register, if the register is empty. Service requests by images are transmitted to the communication adapter with an origination identification ("ID"). This ID is placed in one of the adapter access registers and the service request is placed in the queue. When a support system device responds to the service request, the response is married to the ID and broadcast back to all connected virtualized servers.

38 Claims, 4 Drawing Sheets

MULTI-IMAGE HARDWARE ACCESS SYSTEM FOR MANAGING ACCESS TO COMPUTER SUPPORT SYSTEMS

BACKGROUND OF THE INVENTION

1. Field of the Invention

This invention is related in general to the field of data storage systems. In particular, the invention consists of a system for managing computer support systems.

2. Description of the Prior Art

In FIG. 1, a computer storage system 10 includes host servers ("hosts") 12, data processing servers 14, a data storage system 16, and various support systems 18 such as a power supply 18a, a battery 18b, a fan 18c, and a temperature sensor 18d. Each data processing server 14 may include a plurality of processing devices grouped into a processing cluster ("cluster") 20 and may be substantially identical and redundant. Imposed upon the physical components of the computer storage system 10 may be a multitude of virtualized storage servers referred to as images 22 as shown in FIG. 2. Each image 22 typically resides on two or more clusters. In the event of a cluster failure, however, an image 22 can failover to the remaining clusters.

The support systems 18 are hardware devices that provide services other than data storage. Each image 22 typically has access to and can use these devices. Additionally, these support devices 18 may have the ability to generate reports related to events, faults, and failures. Images 22 communicate with support systems 18 through a remote procedure call ("RPC") adapter 24.

In one configuration, each image 22 would access the support systems 18 through its own RPC adapter 24. However, this approach is extremely expensive due to the cost of redundant hardware. Additionally, each RPC adapter 24 may be dramatically underutilized. Therefore, it is desirable to have a system for establishing communicating with support systems 18 that is efficient and economical.

In U.S. Pat. No. 5,633,999, Clowes et al. disclose workstation-implemented data storage re-routing for server fault-tolerance. Cross-mirroring in a multi-host data storage system provides fault-tolerance without significant redundant hardware and without a single point of failure in the data storage paths. However, Clowes does not describe a system for sharing access to support systems through a set of RPC adapters.

Another approach is to utilize a static multi-tiered architecture that allows one image to own the RPC adapters 24 and require that other images access the support systems 18 indirectly through the owning image. However, a problem occurs if the image 22 tasked with managing the support systems 18 fails, precluding use of the support systems 18 by the other viable images. Accordingly, it is desirable to have a system for establishing ownership over support systems 18 while allowing direct access to the RPC adapters 24 by other images 22.

In a traditional dynamic system, an RPC adapter 24 may be owned by one image at a time, only for as long as the image requires use of the support systems 18. The RPC adapter 24 is then released and made available for use by another image. However, a contention may develop between images 22 seeking concurrent control over the RPC adapter 24. Accordingly, it is desirable to have a system for establishing control of the RPC adapter 24 that prevents contention.

In U.S. Pat. No. 5,553,287, Bailey et al. disclose a computer system for switchably connecting an input/output ("I/O") device to a host via a channel subsystem in connection with means for dynamically managing I/O connectivity. Bailey's invention includes a centralized control lock associated with hardware resources. However, no resources are provided for identifying which image is responsible for managing each hardware resource. Accordingly, it is desirable to have a master lock that identifies the owning image.

SUMMARY OF THE INVENTION

The invention disclosed herein utilizes a master lock register that can be accessed by each virtualized server ("image") within a computer system. A master lock resides within each target device. When an image is established, it accesses the master lock register to ascertain if a master lock has already been allocated. If not, the image obtains the master lock via one of many means. Obtaining a master lock can be accomplished by writing to a given register, writing a pattern into a memory location on the target device, or through a discrete activity such as holding a given communication line active or grounded. For those implementations using registers or memory, a simple binary obtained pattern can be applied or a master image may write its identification ("ID") to the master lock register. Multiple requests for the master lock are serialized by the master lock register and only one device can assert its ID.

The use of a master lock allows each of many images to access and use the support system as a target device. While each image in the computer system may access and use the support system, only the master image is responsible for acting as a target to the device, and receiving and driving the reporting and logging for reports related to support system events, faults, and failures. Additionally, only the master image may manage the associated support system. In one implementation, the target device uses a broadcast protocol to send uninitiated messages ("alerts") to all devices. Images selectively act upon or ignore the alerts based on the image's knowledge of its master/non-master status.

In another implementation, the target device has a unique ID for the master image, and uses that ID to route or address messages so as to only be received by the master image. As for responses to messages initiated by images ("responses"), the device again can use a variety of messaging options. In one implementation, a device can temporarily store a return address of incoming messages and use the return address to intelligently route the response. In yet another implementation, the device can broadcast responses, forcing images to identify their response from all broadcasts. In another implementation, the fabric or network between the image and target device can handle the routing of responses.

A target device can contain registers, memory, sensor states, discrete values, or other dynamic information desired by the images. In one embodiment of the invention, when an image needs access to a support system, the image creates a request message with an embedded identifier. When the RPC adapter receives the request message, the unique identifier is stripped from the request message and placed in a buffer while the request is handled by the target device. When a support system generates a response to the request, the RPC adapter marries the requesting image's identifier to the response. The response message is ignored by all images other than the requesting image. As noted, there are a variety of means of providing responses, depending on the requirements of a given implementation and designer preference.

One advantage of the invention is that every image can independently and directly communicate with a support device without interference or contention from other images. Additionally, an originating image is ensured of receiving its response based on its identification. Yet another advantage is that no image-to-image communication is required. Many tradition device arbitration schemes require images to contend among themselves using various image-to-image communication methods. However, in complex systems this is not preferred because of the overhead or performance loss in doing image-to-image communication or because it is desirable that images be entirely and completely isolated and independent from each other for security and reliability reasons. This invention uniquely allows for multiple images to agree on device ownership without requiring or using an open communication channel between the images.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using a master lock register, a plurality of adapter access registers, a queue, and a digital processing device to dynamically utilize a communication adapter between a plurality of virtualized servers and one or more support services in a computer system. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
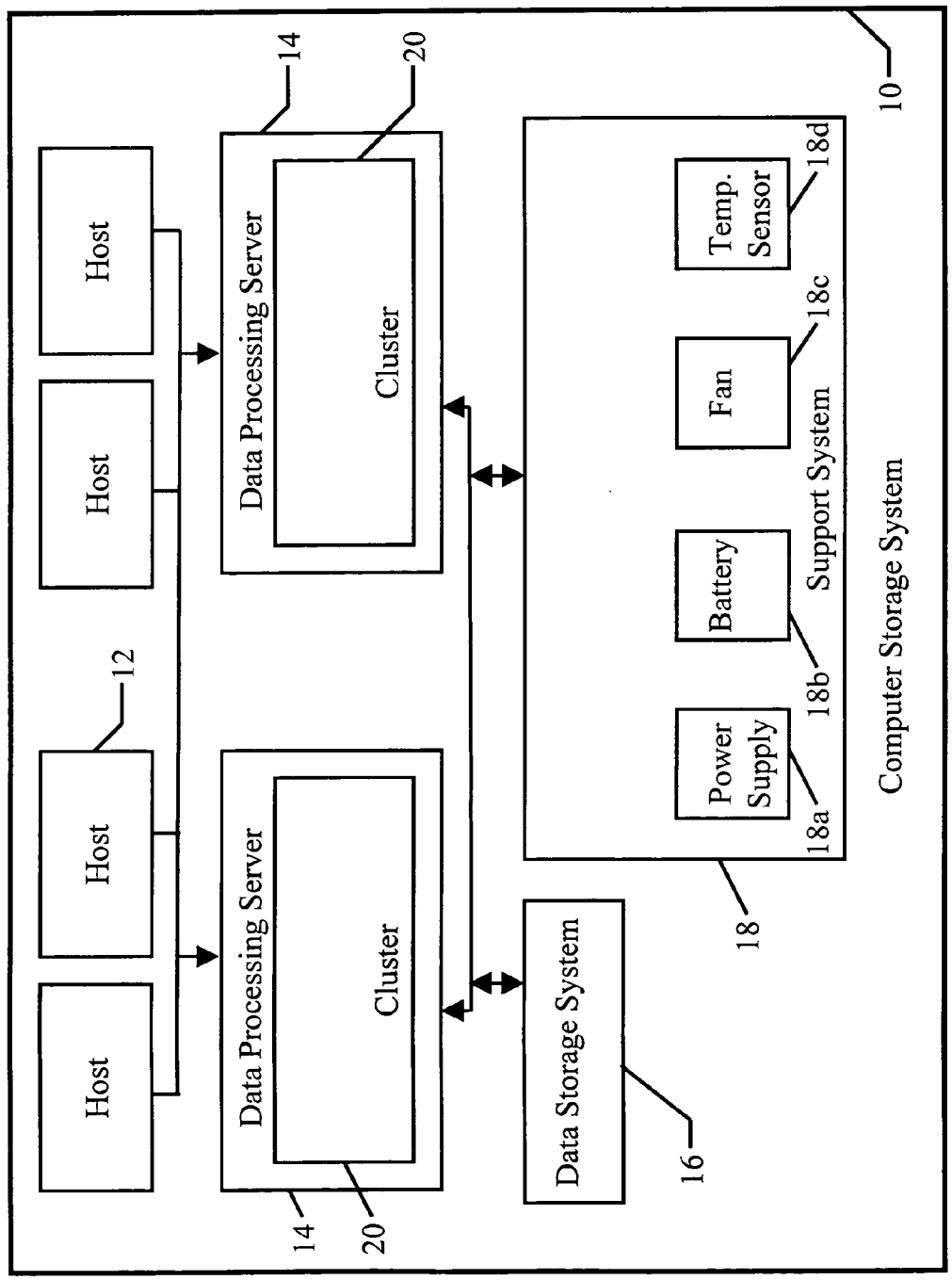
FIG. 1 is a block diagram illustrating a traditional computer storage system including host servers, data processing servers, data storage devices, and a support system.
Figure 2:
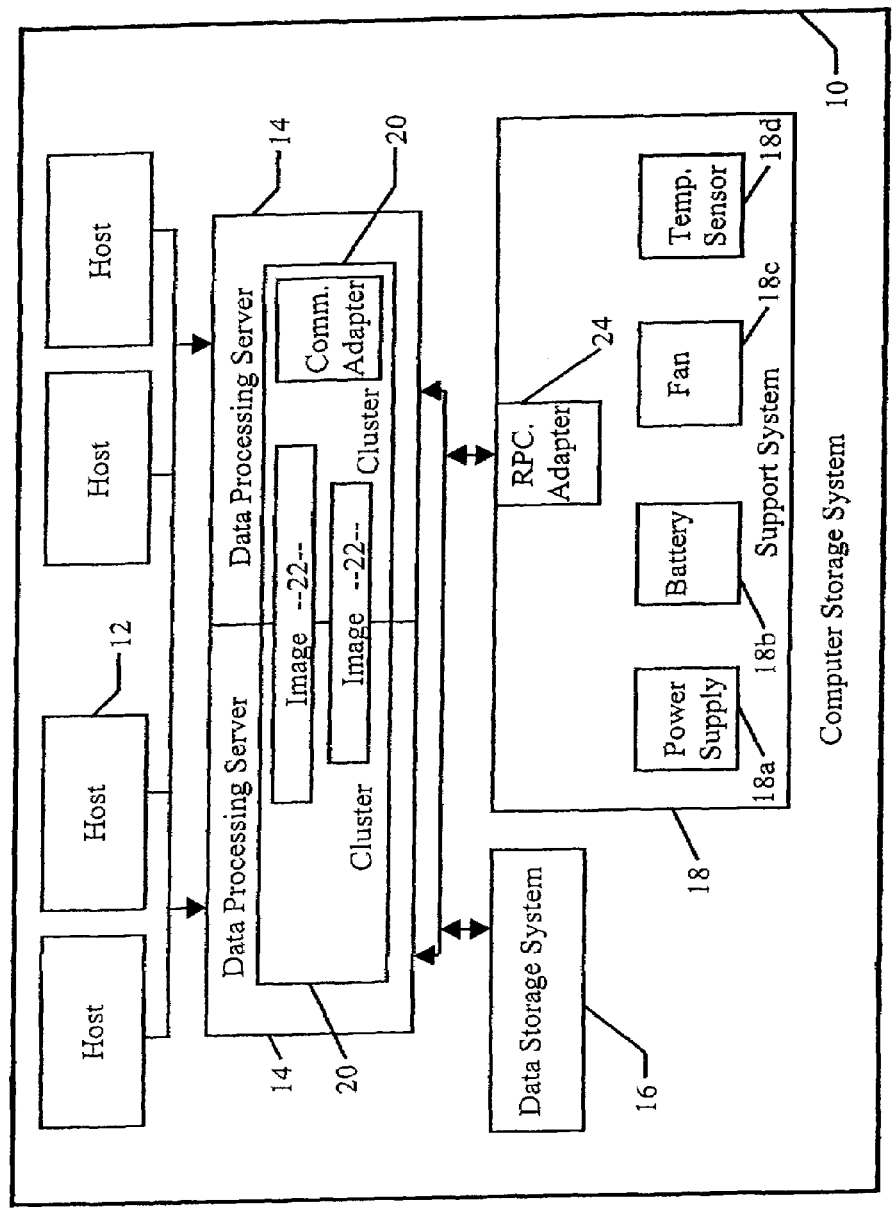
FIG. 2 is a block diagram illustrating the computer storage system of FIG. 1 with a plurality of virtualized servers ("images") and communication adapters.
Figure 3:
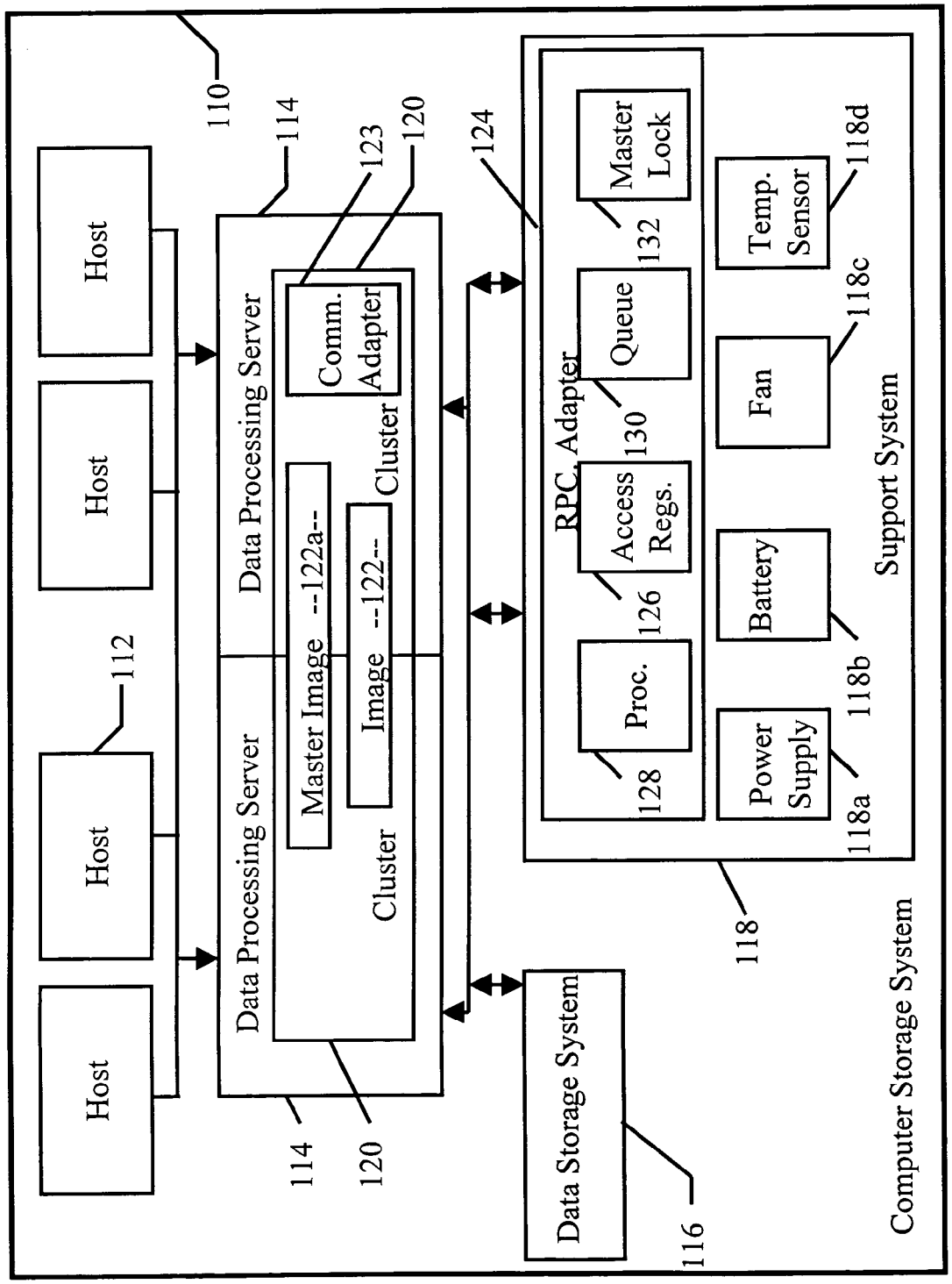
FIG. 3 is a block diagram of a computer storage system according to the invention including a master lock register, a queue, a processing device, and a plurality of RPC access registers.

Referring to figures, wherein like parts are designated with the same reference numerals and symbols, FIG. 3 is a block diagram illustrating a computer storage system 110 that includes host servers ("hosts") 112, data processing servers 114, a data storage system 116, and a support system 118. The data storage system 116 may include a plurality of data storage devices such as hard disk drives, optical disk drives, or tape-cartridge drives. Each data processing server 114 may include a plurality of processing devices grouped into a processing cluster ("cluster") 120 and may be substantially identical and redundant.

Additionally, the support system 118 includes a master lock register 132, a plurality of adapter access registers 126, a queue 130, and a digital processing device ("processor") 128 such as a microprocessor, a general purpose central processing unit ("CPU"), or a programmable logic device such as an FPGA, CPLD, PLA, or ASIC. The data processing server 114 includes a communication adapter 123 and the support system 118 includes another communication adapter 124, such as remote procedure call ("RPC") adapter.

Imposed upon the physical components of the computer storage system 110 is a multitude of virtualized storage servers referred to as images 122. Each image 122 typically resides on two or more clusters. In the event of a cluster failure, however, an image 122 can failover to the remaining clusters.

The support system 118 is a hardware device that provides services other than data storage. In this embodiment of the invention, the support system 118 is a power controller card connected to a power supply 118a, a battery 118b, a fan 118c, or a temperature sensor 118d. Alternatively, a support system may be a stand-alone device such as a power supply with its own master lock register, its own plurality of adapter access registers, its own queue, and its own processor. Each image 122 typically has access to and can use these support devices.

When an image is established, it accesses the master lock register to ascertain if a master lock has already been allocated. If not, the image obtains the master lock via one of many means. Obtaining a master lock can be accomplished by writing to a given register, writing a pattern into a memory location on the target device, or through a discrete activity such as holding a given communication line active or grounded. For those implementations using registers or memory, a simple binary obtained pattern can be applied or a master image may write its identification ("ID") to the master lock register. Multiple requests for the master lock are serialized by the master lock register and only one device can assert its ID.

The support system 118 sends out reports related to events, faults, and failures, although this is not a requirement for utilization of the invention. An entirely passive device may utilize the invention as the master image that owns the device would simply be the device managing service. Or, the owning device may hold vital product data ("VPD") for the target device. However, only one image, the master image 122a, may own each support system or device 118, i.e., be responsible for accepting these reports, for responding to the events, faults, and failures, and for managing these support systems. System events generated by support systems 118 are broadcast by the communication adapter 124 to all connected images 122. However, the broadcast system event is ignored by all images other than the master image 122a. As previously noted, this is but one means of notifying the master image of events requiring intervention, logging, service, or reporting.

Figure 4:
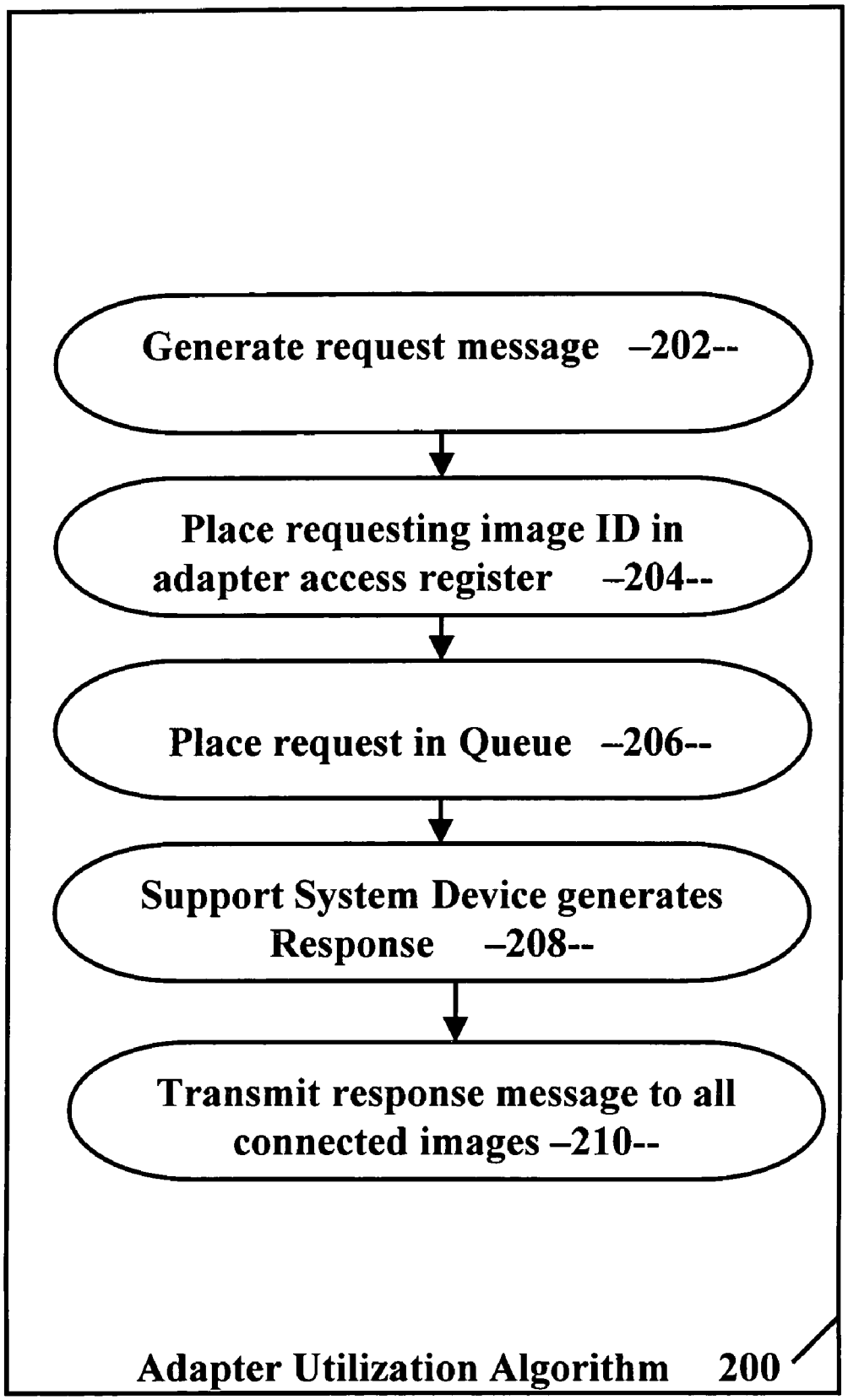
FIG. 4 is a flow chart illustrating a communication adapter utilization algorithm.

The process of dynamically allowing adapter utilization by a plurality of images 122 is illustrated in the communication adapter utilization algorithm 200 of FIG. 4. When an image 122 requires the use of a support system 118, the image generates a request message including its identification ("ID") in step 202. Alternatively, a communication fabric or processor may identify the source of a request and generate the ID.

In step 204, the processor 128 places the identification ("ID") in one of the adapter access registers or buffers 126. Alternatively, the ID may be managed within the communication fabric, the processor, or support system 118. Optionally, in step 206, the request is placed in the queue 130 or is immediately handled by the support device.

In step 208, the support system device 118a generates a response. In step 210, the communication adapter 124 marries the response to the requesting image's ID 126a and broadcasts the resulting response message to all connected images 122. Alternatively, the fabric may include bridges and routers that can route the response message to the originating image. The response message is ignored by all images other than the requesting image.

Those skilled in the art of making computer support systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A multi-image hardware access device, comprising:
    at least one data processing server configured to operate a first virtual server including a first image and a second virtual server including a second image, each of the first and second images generating a device request message, each device request message including a device request and a requesting image identification;
    a first communication adapter connected to the at least one data processing server, the first communication adapter communicating with the first and second images; and
    a support system including a second communication adapter connected to the first communication adapter, said second communication adapter including an adapter access register, a queue and a master lock register, the second communication adapter receiving the device request messages generated by said first and second images, placing the requesting image identifications in the adapter access register, placing the device requests in the queue, and placing a master lock identification in the master lock register, the master lock identification identifying the image that generated the first received device request message;
    wherein the support system is managed by only the image identified by the master lock identification.

2. The multi-image hardware access device of claim 1, wherein the support system includes a support system device.

3. The multi-image hardware access device of claim 1, wherein the communication adapter receives a response from the support system, generates a response message by combining the response with the requesting image identification ("ID"), and transmits the response message to the first image.

4. The multi-image hardware access device of claim 3, wherein the communication adapter transmits the response message using a broadcast.

5. The multi-image hardware access device of claim 2, wherein the support system device includes a power supply.

6. The multi-image hardware access device of claim 2, wherein the support system device includes a battery.

7. The multi-image hardware access device of claim 2, wherein the support system device includes a fan.

8. The multi-image hardware access device of claim 2, wherein the support system device includes a temperature sensor.

9. The multi-image hardware access device of claim 2, wherein the support system device includes a power controller card.

10. The multi-image hardware access device of claim 1, wherein the second communication adapter is a remote procedure call ("RPC") adapter.

11. A method of utilizing a support system, comprising the steps of:
    transmitting a device request message from a first virtual server image and a device request message from a second virtual server image, each device request message including a device request and a requesting image identification ("ID"), where both device request messages are transmitted from a first communication adapter to a second communication adapter;
    placing each requesting image ID in an adapter access register;
    placing each device request in a queue;
    placing a master lock identification in a master lock register, the master lock identification identifying the virtual server image that was the source of the first received device request message; and
    causing only the virtual server image that was the source of the first received device request message to manage the support system.

12. The method of claim 11, further comprising the steps of:
    transmitting a response from a support system device to the second communication adapter;
    creating a response message by combining the response with the requesting image ID; and
    transmitting the response message from the second communication adapter to the first communication adapter.

13. The method of claim 11, wherein the second communication adapter is a remote procedure call ("RPC") adapter.

14. The method of claim 12, wherein the step of transmitting the response message includes broadcasting the response message.

15. The method of claim 14, wherein the support system device a power supply.

16. The method of claim 14, wherein the support system device includes a battery.

17. The method of claim 14, wherein the support system device includes a fan.

18. The method of claim 14, wherein the support system device includes a temperature sensor.

19. The method of claim 14, wherein the support system device includes a power controller card.

20. An article of manufacture including a data storage medium, said data storage medium including a set of machine-readable instructions that are executable by a processing device to implement an algorithm, said algorithm comprising the steps of:
    transmitting a device request message from a first virtual server image and a device request message from a second virtual server image, each device request message including a device request and a requesting image identification ("ID") where both device request messages are transmitted from a first communication adapter to a second communication adapter;
    placing each requesting image ID in an adapter access register; and
    placing each device request in a queue;
    placing a master lock identification in a master lock register, the master lock identification identifying the virtual server image that was the source of the first received device request message; and
    allowing only the virtual server image that was the source of the first received device request message to manage the support system.

21. The article of manufacture of claim 20, further comprising the steps of:
- transmitting a response from a support system device to the second communication adapter;
- creating a response message by combining the response with the requesting image ID; and
- transmitting the response message from the second communication adapter to the first communication adapter.

22. The article of manufacture of claim 20, wherein the second communication adapter is a remote procedure call ("RPC") adapter.

23. The article of manufacture of claim 21, wherein the step of transmitting the response message includes broadcasting the response message.

24. The article of manufacture of claim 23, wherein the support system device a power supply.

25. The article of manufacture of claim 23, wherein the support system device includes a battery.

26. The article of manufacture of claim 23, wherein the support system device includes a fan.

27. The article of manufacture of claim 23, wherein the support system device includes a temperature sensor.

28. The article of manufacture of claim 23, wherein the support system device includes a power controller card.

29. A method of providing a service for managing a support system, comprising integrating computer-readable code into a computing system, wherein the computer-readable code in combination with the computing system is capable of performing the following steps:
- transmitting a device request message from a first virtual server image and a device request message from a second virtual server image, each device request message including a device request and a requesting image identification ("ID") where both device request messages are transmitted from a first communication adapter to a second communication adapter;
- placing each requesting image ID in an adapter access register; and
- placing each device request in a queue;
- placing a master lock identification in a master lock register, the master lock identification identifying the virtual server image that was the source of the first received device request message; and
- allowing only the virtual server image that was the source of the first received device request message to manage the support system.

30. The method of claim 29, further comprising the steps of:
- transmitting a response from a support system device to the second communication adapter;
- creating a response message by combining the response with the requesting image ID; and
- transmitting the response message from the second communication adapter to the first communication adapter.

31. The method of claim 29, wherein the second communication adapter is a remote procedure call ("RPC") adapter.

32. The method of claim 30, wherein the step of transmitting the response message includes broadcasting the response message.

33. The method of claim 32, wherein the support system device a power supply.

34. The method of claim 32, wherein the support system device includes a battery.

35. The method of claim 32, wherein the support system device includes a fan.

36. The method of claim 32, wherein the support system device includes a temperature sensor.

37. The method of claim 32, wherein the support system device includes a power controller card.

38. The multi-image hardware access device of claim 1,
- wherein, the master lock register includes master lock identification, which identifies one of first and second images;
- wherein the adapter access register includes a value indicative of the identification of a requesting image; and
- wherein the queue includes a device request.

* * * * *

UNITED STATES PATENT AND TRADEMARK OFFICE
CERTIFICATE OF CORRECTION

PATENT NO. : 7,581,046 B2
APPLICATION NO. : 10/991732
DATED : August 25, 2009
INVENTOR(S) : Crawford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Fourteenth Day of September, 2010

David J. Kappos
*Director of the United States Patent and Trademark Office*